United States Patent
Fu et al.

(10) Patent No.: US 7,117,582 B2
(45) Date of Patent: Oct. 10, 2006

(54) METHOD OF ASSEMBLING A HARD DISK DRIVE HAVING A MOTOR BRACKET TOOLING HOLE FOR INVERTED MOTOR-TO-BASE MERGE PROCESS

(75) Inventors: Ta-Chang Fu, San Jose, CA (US); Ungtae Kim, San Jose, CA (US); Robert A. Lenicheck, Palo Alto, CA (US); Sattar Malek, San Jose, CA (US); Stanley Yen Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 466 days.

(21) Appl. No.: 10/669,068

(22) Filed: Sep. 23, 2003

(65) Prior Publication Data

US 2005/0060871 A1    Mar. 24, 2005

(51) Int. Cl.
- *B23P 19/00* (2006.01)
- *B25B 27/14* (2006.01)
- *G11B 5/84* (2006.01)

(52) U.S. Cl. ............... 29/603.03; 29/281.1; 29/281.5; 29/559; 29/603.04; 29/760; 269/47

(58) Field of Classification Search ............... 29/760, 29/281.1, 281.5, 759, 559, 603.03, 603.04; 269/47

See application file for complete search history.

(56) References Cited

U.S. PATENT DOCUMENTS

| | | | |
|---|---|---|---|
| 5,309,628 A * | 5/1994 | Fukuchi et al. | ............... 29/759 |
| 5,942,820 A * | 8/1999 | Yoshida | ................... 310/67 R |
| 6,874,219 B1 * | 4/2005 | Hanssen et al. | ......... 29/525.11 |

OTHER PUBLICATIONS

[X_01]: Jin-Wei Tioh, BlueSmoke—HDD Article: IBM Deskstar 60GXP, Aug. 31, 2001 Internet: http://bluesmoke.net/hdd3_p.html.*

* cited by examiner

*Primary Examiner*—Peter Vo
*Assistant Examiner*—Livius Radu Cazan
(74) *Attorney, Agent, or Firm*—Bracewell & Giuliani LLP

(57) ABSTRACT

A method of enabling a reliable, motor-to-base merge process is designed for motors that are attached to a base with screws that mount from outside of the base. An assembly fixture receives the motor, which has a tooling hole for circumferentially locating the motor relative to the base. The assembly fixture closely receives the motor and has a tooling pin that engages the tooling hole to prevent rotation of the motor relative to the assembly fixture. During the motor-to-base merge process, the motor is inverted with the tooling pin in the tooling hole. The assembly fixture aligns the threaded screw holes in the motor with the mounting holes on the base.

5 Claims, 5 Drawing Sheets

METHOD OF ASSEMBLING A HARD DISK DRIVE HAVING A MOTOR BRACKET TOOLING HOLE FOR INVERTED MOTOR-TO-BASE MERGE PROCESS

BACKGROUND OF THE INVENTION

1. Technical Field

The present invention relates in general to an improved hard disk drive design and assembly process and, in particular, to an improved method of assembling a hard disk drive having a motor bracket tooling hole for an inverted motor-to-base merge process.

2. Description of the Related Art

Data access and storage systems typically comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The attachment of the spindle motor to the housing or base of the hard disk drive is typically accomplished by a manual installation procedure. The spindle motor usually has a series of threaded holes in which screws mount and secure the spindle motor to the housing. Since some spindle motors must be installed "blindly" such that the threaded holes are not within the view of the person assembling the disk drive, it is both time consuming and costly to precisely align and assemble the spindle motor to the housing. Thus, an improved method of assembling spindle motors in hard disk drives would be desirable.

SUMMARY OF THE INVENTION

One embodiment of a method of enabling a reliable, motor-to-base merge process is disclosed. The present invention is well suited for motors that are attached to a base with screws that mount from outside of the base. The motor has a motor mounting bracket, and a tooling hole is provided on a top side of the motor mounting bracket. The motor is circumferentially located relative to the base by an assembly fixture. The assembly fixture has a large aperture that closely receives the hub of the motor, and a tooling pin that engages the tooling hole. When the motor is properly positioned on the assembly fixture, the motor is prevented from rotating relative to the assembly fixture. During the motor-to-base merge process, the motor is inverted or positioned upside-down relative to the base, with the tooling pin engaged in the tooling hole. The assembly fixture aligns the threaded screw holes in the motor mounting bracket with the mounting holes on the base during the motor-to-base merge process. This sequence may be performed manually or automated for more rapid throughput.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
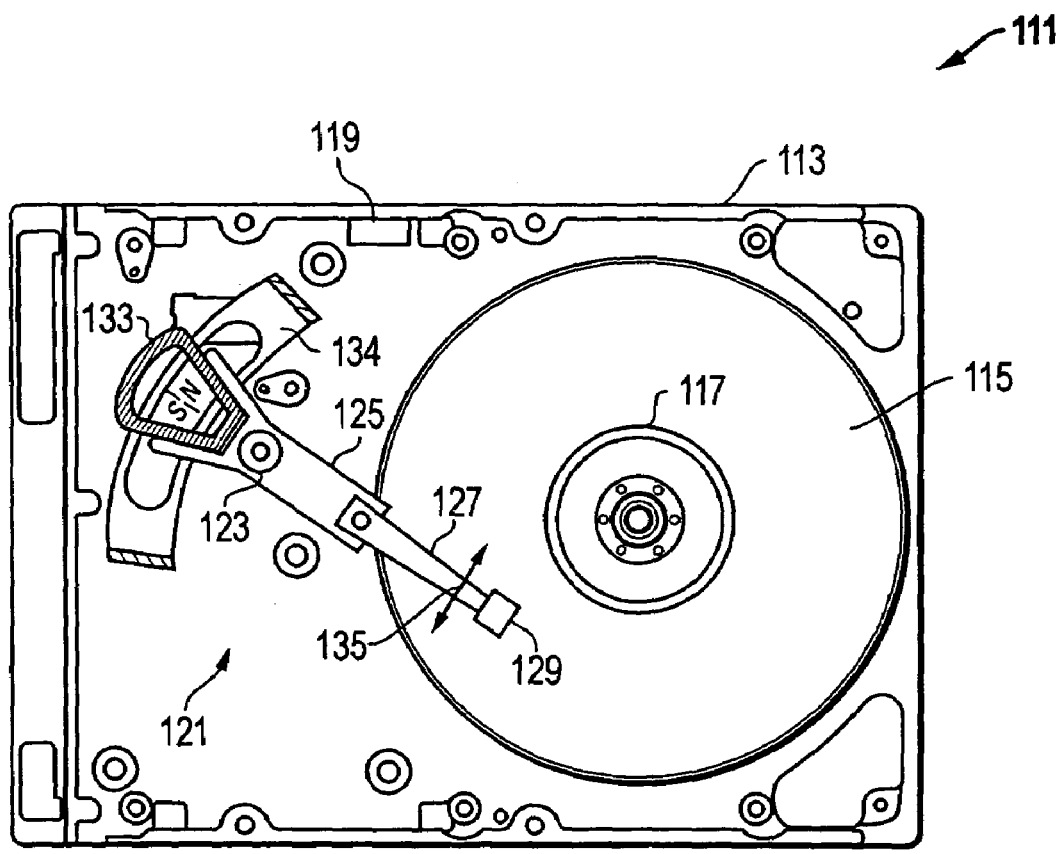
FIG. 1 is a schematic plan view of a hard disk drive constructed in accordance with the present invention and shown with a cover removed.
Figure 3:
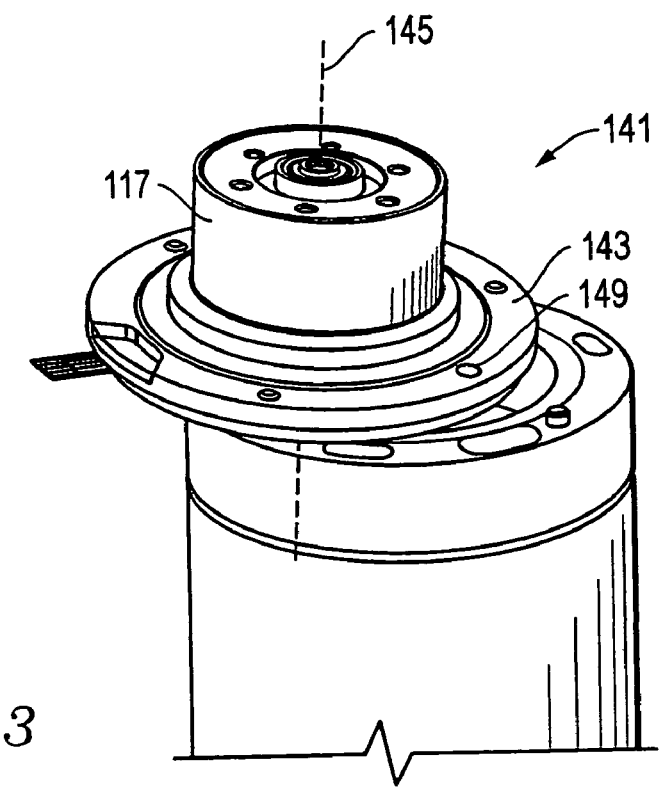
FIG. 3 is an isometric view of a spindle motor of the hard disk drive of FIG. 1 prior to location in the assembly fixture of FIG. 2.
Figure 4:
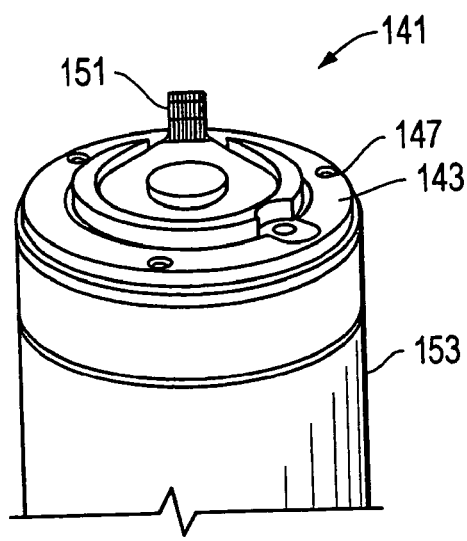
FIG. 4 is an isometric view of the spindle motor of FIG. 3 located in the assembly fixture of FIGS. 2 and 3.
Figure 5:
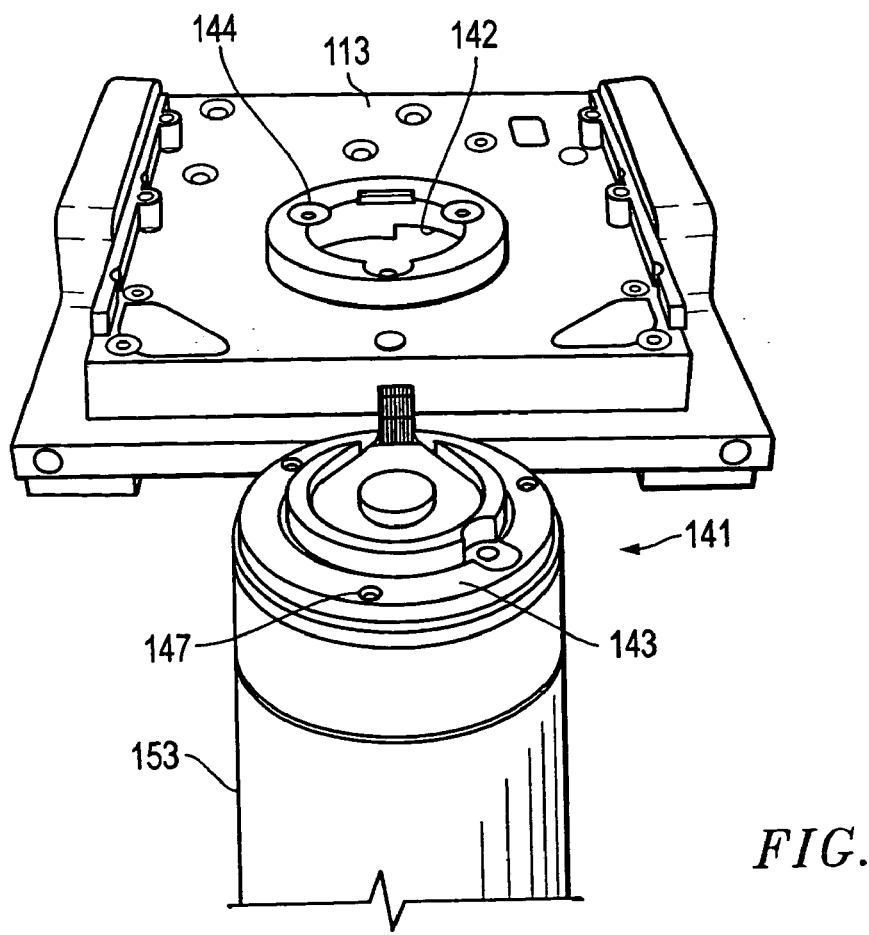
FIG. 5 is an isometric view of the spindle motor and assembly fixture of FIG. 4 prior to installation in a base of the hard disk drive of FIG. 1.
Figure 6:
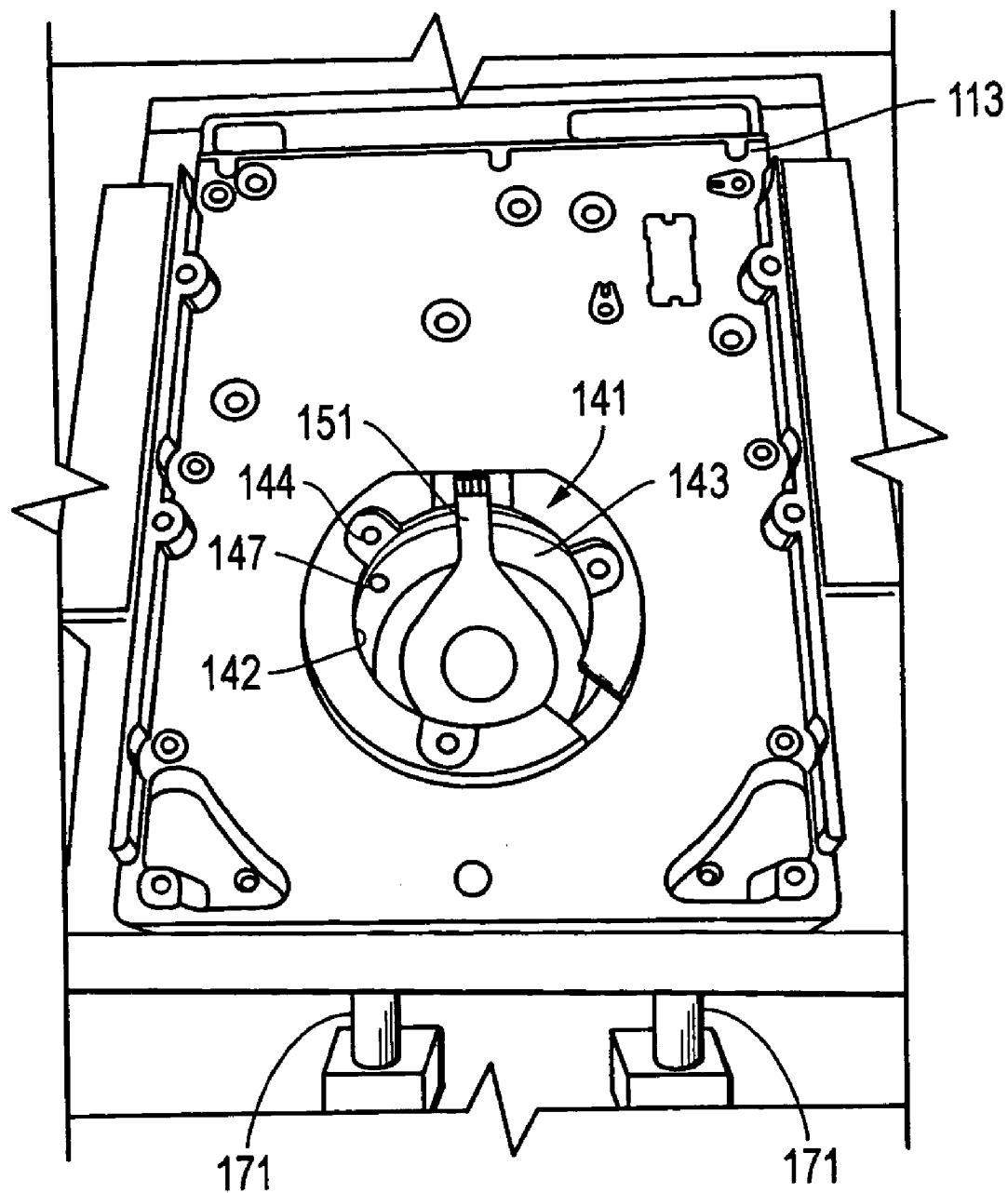
FIG. 6 is a top view of the spindle motor being installed in the base of FIG. 5.
Figure 7:
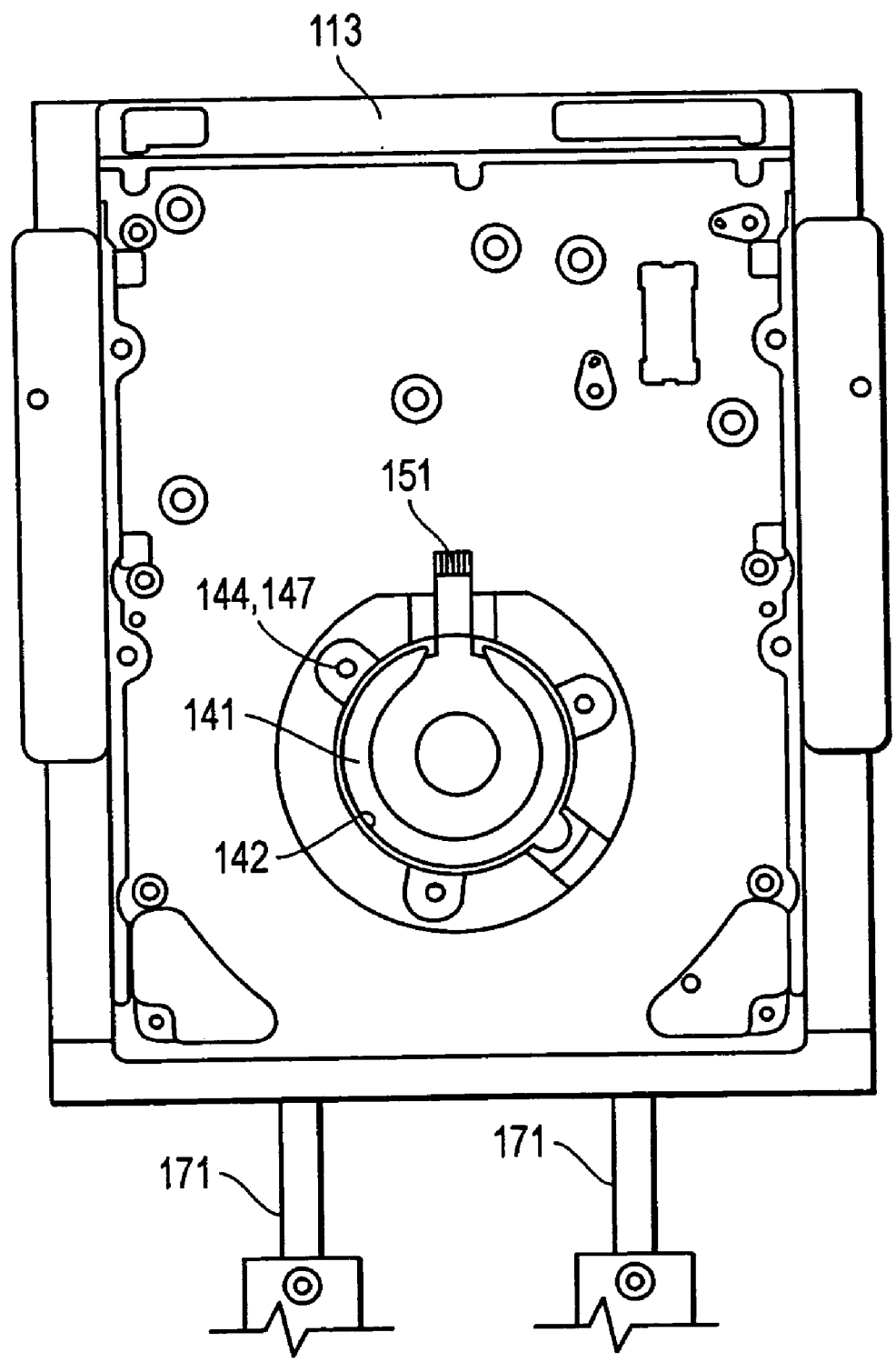
FIG. 7 is a top view of the spindle motor after alignment in the base of FIG. 5.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly 141 (see FIG. 3) having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700×230 microns) and is pre-loaded against the surface of disk 115 (in the range two to ten grams) by suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Referring now to FIGS. 2–7, one embodiment of a system, method, and apparatus for mounting the spindle motor 141 to the base 113 of the hard disk drive 111 is shown. The base 113 has a motor mounting opening 142 with a plurality of fastener holes, such as screw holes 144, positioned adjacent to the motor mounting opening 142. The spindle motor 141 has an axis 145, a hub 117, a motor mounting bracket 143 circumscribing and coaxial with the hub 117. A plurality of blind threaded screw holes 147 (FIG. 4) are formed in one side (e.g., an exterior side) of the motor mounting bracket 143. In one embodiment, a tooling feature, such as a tooling hole 149 (FIG. 3), is formed on an opposite side (e.g., an interior side) of the motor mounting bracket 143. A flat cable 151 (FIG. 4) extends radially from and substantially perpendicular to the axis 145.

Figure 2:
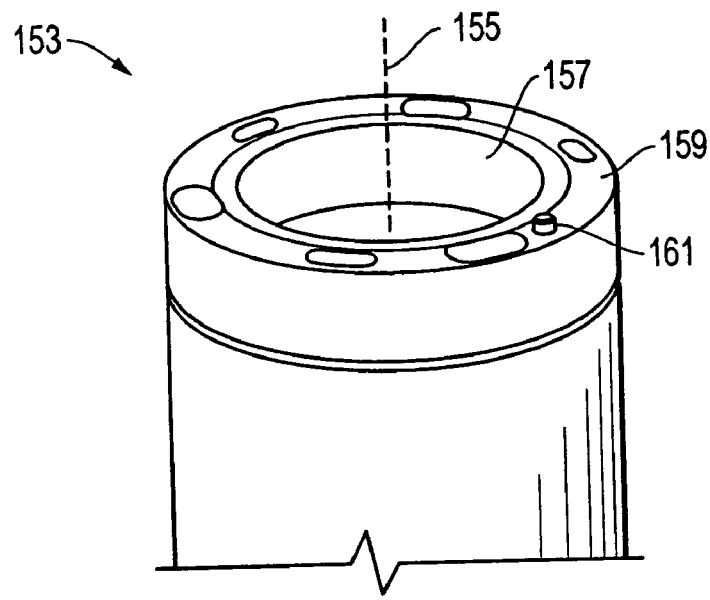
FIG. 2 is an isometric view of one embodiment of an assembly fixture constructed in accordance with the present invention.

Referring now to FIG. 2, the present invention also utilizes an assembly fixture 153 having an axis 155 and a central aperture 157 that is concentric with the axis 155. The aperture 157 is designed to closely receive the hub 117 of the spindle motor 141. A rim 159 surrounds the aperture 157 and is designed to support the motor mounting bracket 143 of the spindle motor 141. In the embodiment shown, a tooling feature, such as a tooling pin 161, extends from the rim 159 in an axial direction. The tooling pin 161 is provided to engage the tooling hole 149 in the motor mounting bracket 143 and to prevent rotation of the spindle motor 141 relative to the assembly fixture 153 during the installation and alignment process.

The assembly fixture 153 rotationally aligns and installs the spindle motor 141 in the motor mounting opening 142 of the base 113. In one embodiment (FIGS. 6 and 7), the flat cable 151 is located on one side (e.g., an exterior) of the base 113, and the hub 117 of the spindle motor 141 is located on an opposite side (e.g., an interior) of the base 113. The spindle motor 141 is secured to the base 113 with fasteners, such as machine screws, that extend through the screw holes 144 in the base 113 into the blind threaded screw holes 147 in the motor mounting bracket 143. The screws mount to the spindle motor 141 from an exterior of the base 113. The spindle motor 141 may be manually or automatically assembled to the base 113, such as by robotic manipulation 171 (FIGS. 6 and 7) of the assembly fixture 153.

In operation (FIGS. 3–7), the present invention also comprises a method of mounting the spindle motor 141 to the base 113 of the hard disk drive 111. In one embodiment, the method comprises providing the spindle motor 141 (FIG. 3) with the hub 117, a first tooling feature (e.g., tooling hole 149), and fastener holes 147 (FIG. 4), the assembly fixture 153 (FIG. 2) with a receptacle 157 and a second tooling feature (e.g., tooling pin 161), and the base 113 (FIG. 5) with a motor opening 142 and fastener holes 144. The next step comprises placing the hub 117 of the spindle motor 141 in the receptacle 157 of the assembly fixture 153 (FIG. 4) such that the first and second tooling features 149, 161 engage each other to position the spindle motor 141 in a desired orientation and prevent rotation of the spindle motor 141 relative to the assembly fixture 153.

The method further comprises moving the assembly fixture 153 toward the base 113 (FIG. 6), and then installing the spindle motor 141 in the motor opening 142 of the base 113 with the assembly fixture 153 (FIG. 7), such that the fastener holes 147, 144 of the spindle motor 141 and of the base 113, respectively, align. Furthermore, the cable 151 of the spindle motor 141 may located on an exterior side of the base 113 and the hub 117 is located on an interior side of the base 113. Finally, the method comprises securing the spindle motor 141 to the base 113 with fasteners (such as screws) and removing the hub 117 of the spindle motor 141 from the receptacle 157 in the assembly fixture 153.

As alluded to above, the method may comprise positioning the first tooling feature 149 on one side of the spindle motor 141 and the fastener holes 147 of the spindle motor 141 on an opposite side of the spindle motor 141. In addition, the steps of the method may comprise manually assembling the spindle motor 141 to the base 113, or robotically manipulating the assembly fixture 153 (and the fasteners) to execute the process.

The present invention has several advantages, including the ability to enable a reliable, motor-to-base merge process for the motor that is attached to the base with screws that mount from outside of the base. The invention utilizes a simple motor mounting bracket with a tooling hole to circumferentially locate the motor relative to the base with the assembly fixture. The assembly fixture also prevents the motor from rotating during this process, and may be performed manually or automated for more rapid throughput.

While the invention has been shown or described in only some of its forms, it should be apparent to those skilled in the art that it is not so limited, but is susceptible to various changes without departing from the scope of the invention.

What is claimed is:

1. A method of mounting a spindle motor to a base of a hard disk drive, comprising:
   (a) providing a spindle motor with a hub, a first tooling feature, and fastener holes, an assembly fixture with a receptacle and a second tooling feature, and a base with a motor opening and fastener holes;
   (b) placing the hub of the spindle motor in the receptacle of the assembly fixture such that the first and second tooling features engage each other to position the spindle motor in a desired orientation and prevent rotation of the spindle motor relative to the assembly fixture;
   (c) moving the assembly fixture toward the base;
   (d) installing the spindle motor in the motor opening of the base with the assembly fixture such that the fastener holes of the spindle motor and of the base align, and a cable of the spindle motor is located on an exterior side of the base and the hub is located on an interior side of the base; and then
   (e) securing the spindle motor to the base with fasteners and removing the hub of the spindle motor from the receptacle in the assembly fixture.

2. The method of claim 1, wherein step (b) comprises inserting a tooling pin of the second tooling feature into a tooling hole of the first tooling feature.

3. The method of claim 1, wherein step (a) comprises positioning the first tooling feature on one side of the spindle motor and the fastener holes of the spindle motor on an opposite side of the spindle motor.

4. The method of claim 1, wherein steps (b) through (e) comprise manually assembling the spindle motor to the base.

5. The method of claim 1, wherein steps (c) and (d) comprise robotically manipulating the assembly fixture.

* * * * *